June 5, 1956   J. R. RAGAZZINI ET AL   2,749,516
PHASE METER

Filed June 12, 1950   7 Sheets-Sheet 1

INVENTOR.
John R. Ragazzini and
Lofti A. Zadeh

BY Moses, Nolte, Crewe & Berry
ATTORNEYS

June 5, 1956 J. R. RAGAZZINI ET AL 2,749,516
PHASE METER
Filed June 12, 1950 7 Sheets-Sheet 2

INVENTOR.
John R. Ragazzini and
Lotfi A. Zadeh

BY Moses, Nolte, Crews & Berry
ATTORNEYS

June 5, 1956  J. R. RAGAZZINI ET AL  2,749,516
PHASE METER

Filed June 12, 1950  7 Sheets-Sheet 5

Fig. 8C.

INVENTOR.
John R. Ragazzini and
Lofti A. Zadeh

BY Moses, Nolte, Crews & Berry
ATTORNEYS

June 5, 1956  J. R. RAGAZZINI ET AL  2,749,516
PHASE METER
Filed June 12, 1950  7 Sheets-Sheet 6

Fig.9A.

INVENTOR.
John R. Ragazzini and
Lotfi A. Zadeh

BY Moser, Nolte, Crews & Berry
ATTORNEYS

Fig. 9B.

United States Patent Office 2,749,516
Patented June 5, 1956

2,749,516
PHASE METER
John R. Ragazzini and Lofti A. Zadeh, New York, N. Y.

Application June 12, 1950, Serial No. 167,550

10 Claims. (Cl. 324—88)

This invention relates to a method of measuring the phase angle between two voltages and to apparatus for making such measurements.

An object of the invention is to provide an improved phase meter having a direct reading calibrated phase shifter.

Another object is to provide a phase meter having a phase angle scale which is independent of frequency.

A further object is to measure phase differences with high precision over a wide range of frequencies.

Another object is to provide a phase meter of relatively simple construction adapted for high precision phase angle measurements, and adapted for very simple construction at low cost when measurements of relatively low precision are adequate.

Another object is to measure phase angle differences over a broad band of frequencies without requiring the use of a heterodyne operation and the complications and difficulties inherent with such a heterodyne operation.

Another object is to provide a phase meter in which the actual measurement of phase is accomplished by a single control element, all other control operations being auxiliary to the adjustment of voltage and independent of the actual setting of the phase angle measurement control element.

These and other objects and features of the invention will be understood from the following detailed description in connection with the accompanying drawings, in which:

Figs. 9A and 8B are circuit diagrams of a modified form of phase meter.

Figure 1:
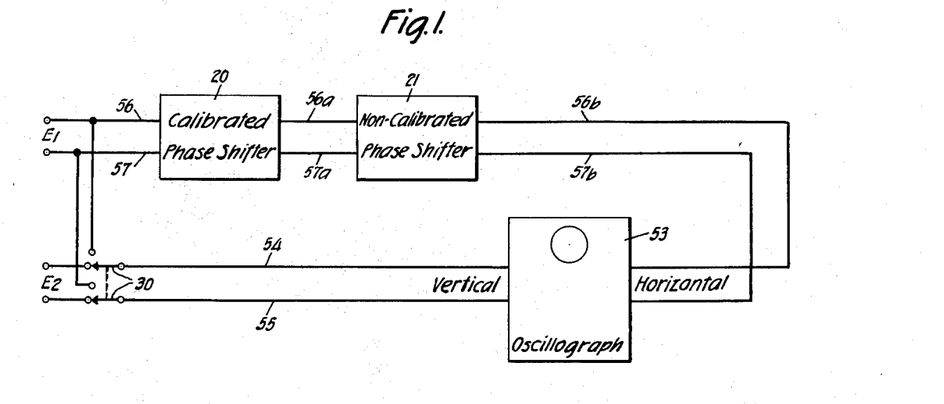
Fig. 1 is a schematic circuit diagram showing the general arrangement for making phase angle measurements.

In Fig. 1 we have indicated a simple form of block diagram fundamental to our invention. In this diagram $E_1$ and $E_2$ are the voltages the phase difference of which is to be measured. The voltage $E_2$ is transmitted directly to the vertical plates of a standard oscillograph 53. $E_1$ is transmitted through two components, the first being a calibrated phase shifter 20, and the second being a non-calibrated phase shifter 21, the output of which is fed to the horizontal plates of the oscillograph.

The method of measurement consists of first placing switch 30 in its upward position, so that the voltage $E_1$ is supplied to both channels. The calibrated phase shifter 20 is originally set to zero because the voltages are from the same source $E_1$ and therefore have a zero phase difference. The non-calibrated phase shifter 21 is now adjusted until the trace on the oscillograph 53 is a collapsed ellipse, indicating that the phase shift in both channels is identical.

The switch 30 is then thrown to the lower position, so that now voltage $E_1$ is in the first channel and $E_2$ is in the second channel. The collapsed ellipse is restored by adjustment of the calibrated phase shifter 20 until it is collapsed once again, and the amount of phase shift that had to be inserted in the calibrated phase shifter is the phase difference between the two voltages $E_1$ and $E_2$.

Figure 2:
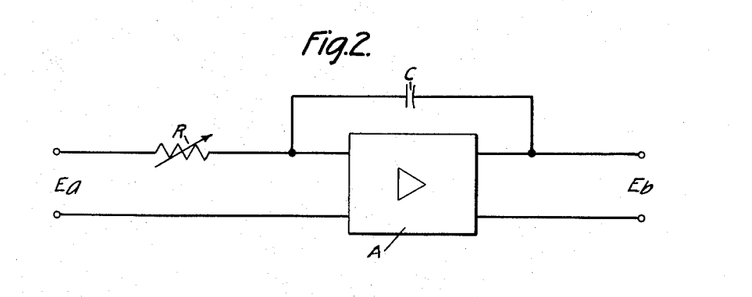
Figure 2 is a circuit diagram of a phase shifting amplifier of the integrator type, and Fig. 3 a similar diagram of a phase shifting amplifier of the differentiator type.
Figure 4:
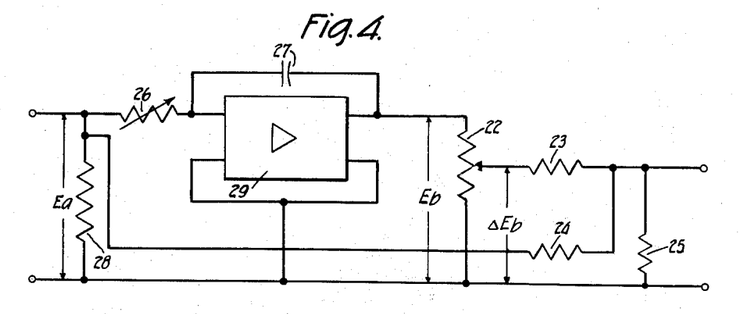
Figures 4 and 6 are schematic diagrams of calibrated phase shifters adapted for use in the phase meter of Fig. 1.

Fig. 4 shows one form of calibrated phase shifter which employs as a component thereof a phase shifting feed back amplifier of the integrator type, shown in Fig. 2, in which the amplifier has the variable resistor R in the upper input conductor and the capacitor C connecting the upper input conductor to the upper output conductor. The input voltage $E_a$ produces the output voltage $E_b$ which is displaced 90° in a leading direction from the input voltage $E_a$. The precision of this 90° displacement is determined by the gain of the amplifier A and the quality of the capacitor C.

Figure 3:
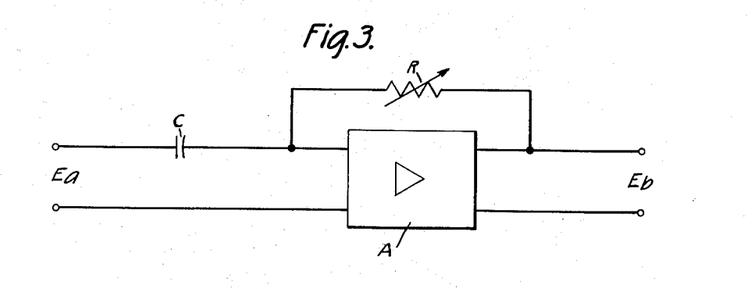

Instead of employing a phase shifting feed back amplifier of the integrator type, as shown in Fig. 2, as a component of the calibrated phase shifter, a phase shifting feed back amplifier of the differentiator type, as shown in Fig. 3, may be substituted therefor. It will be seen that the integrator of Fig. 2 is similar to the differentiator of Fig. 3, except that the resistor R and the capacitor C are interchanged in position in the two figures. In the integrator type of amplifier, the output voltage leads the input voltage by 90°, whereas in the differentiator type, the output voltage lags 90° behind the input voltage.

The amplifier 29, Fig. 4, corresponds with amplifier A, Fig. 2; the variable resistor 26, Fig. 4, corresponds with the resistor R, Fig. 2; and the capacitor 27, Fig. 4, corresponds with the capacitor C, Fig. 2. At the output of the amplifier 29, Fig. 4, is provided an adjustable potentiometer 22, the output voltage $E_b$ being impressed across this potentiometer. A summing network, consisting of resistors 23, 24 and 25, is used to add the voltage $E_a$ and a fraction $\Delta E_b$, of the voltage $E_b$. The adder resistors 23 and 24 are made closely equal to each other, preferably within 1% or better when high accuracy is desired. The variable resistor 26 corresponds to resistor R, Fig. 2, and capacitor 27, Fig. 4, corresponds to the capacitor C of Fig. 2.

In the initial adjustment of the phase shifter, Fig. 4, the input voltage $E_a$ is impressed across the input coupling resistor 28. The magnitude of the output voltage $E_b$ is adjusted to be precisely equal to that of $E_a$, by adjusting the resistor 26. This is achieved when the product $RC\omega$ equals 1, where $\omega$ is $2\pi$ times the frequency. For example, in the vector diagram of Fig. 5, $E_b$ is shown equal in magnitude to $E_a$ and as leading $E_a$ by 90°. The fraction $\Delta E_b$ of $E_b$ that is added to $E_a$ will determine the phase $\theta$ of the resultant vector $E_c$. $\theta$ is precisely known from the relation $$\tan \theta = \frac{\Delta E_b}{E_a}$$

The potentiometer 22 is calibrated to indicate directly the angle $\theta$ for each adjustment of the angle between $\Delta E_b$ and $E_a$ in the calibrated phase shifter, the angle $\theta$ in each case being equal to the arc whose tangent is $$\frac{\Delta E_b}{E_a}$$

Figure 6:
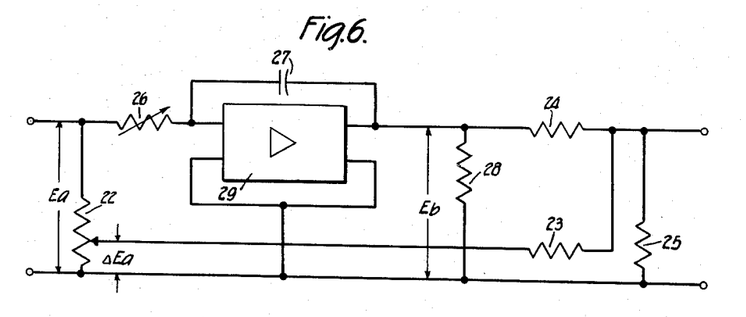

In the process of calibration, account is taken of the loading effect of resistor 23, in Figs. 4 and 6. The maximum phase displacement that can be produced by this process is limited to 45°. This is an advantage, since this makes it possible to provide a nearly linear scale.

Fig. 6 shows the manner in which the circuit of the calibrated phase shifter is altered so that the phase shift range can be extended from 45° to 90°. Again, the integrator type of circuit is used as an example, and the calibrated potentiometer 22 is now connected across the input voltage $E_a$, instead of across the output voltage $E_b$ as in Fig. 4, and a fraction $\Delta E_a$ of $E_a$ is now added through the same summing network 23, 24, 25 to the full value of $E_b$.

It will be noted that the coupling resistor 28 which is equal in resistance to potentiometer 22, is interchanged in position with potentiometer 22 to avoid undesirable changes in the circuit when these resistances are interchanged. While resistor 28 is not essential to the basic operation of the circuit of Fig. 6, it is desirable from the standpoint of good circuit design.

Figure 7:
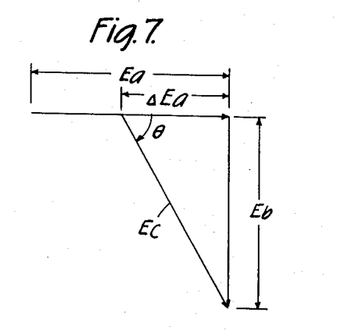

The vector diagram, Fig. 7, shows the angle $\theta$ as being in the sector extending from 45° to 90°. It will be observed from the diagram that the angle $\theta$ is now equal to the angle whose tangent is $$\frac{E_b}{\Delta E_a}$$

Figure 8A:
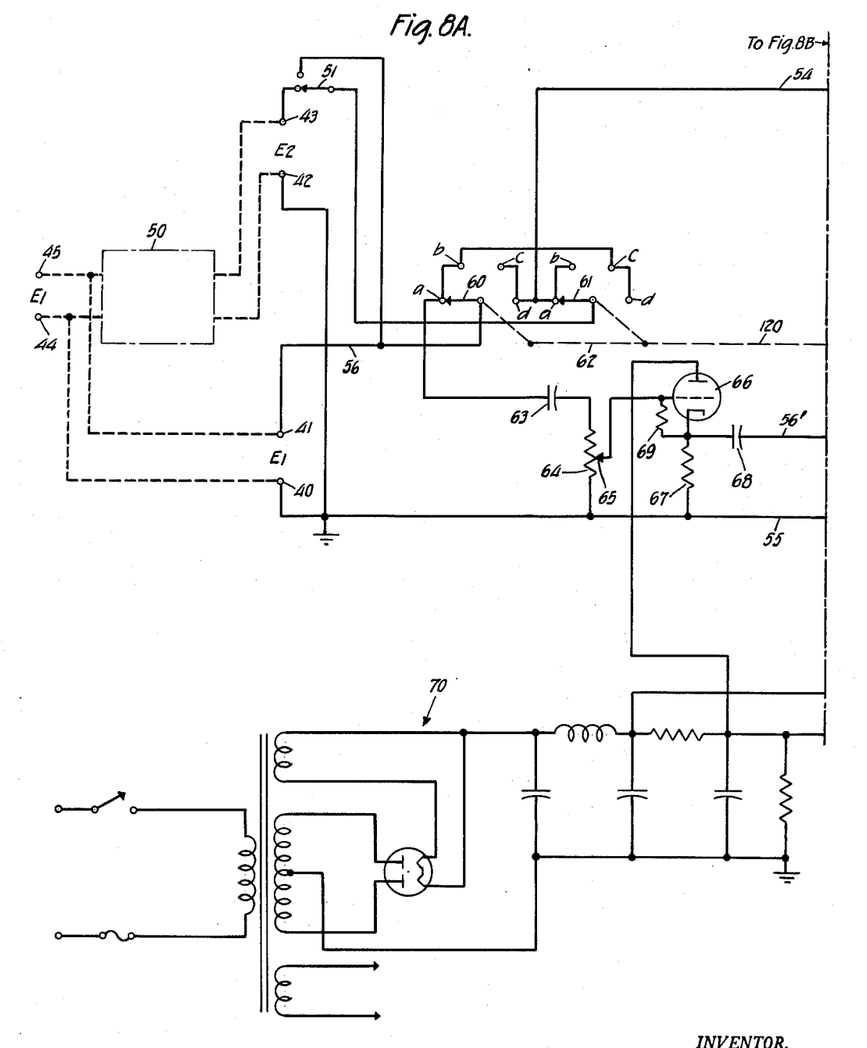
Figs. 8A, 8B and 8C are circuit diagrams of one form of phase meter.
Figure 8B:
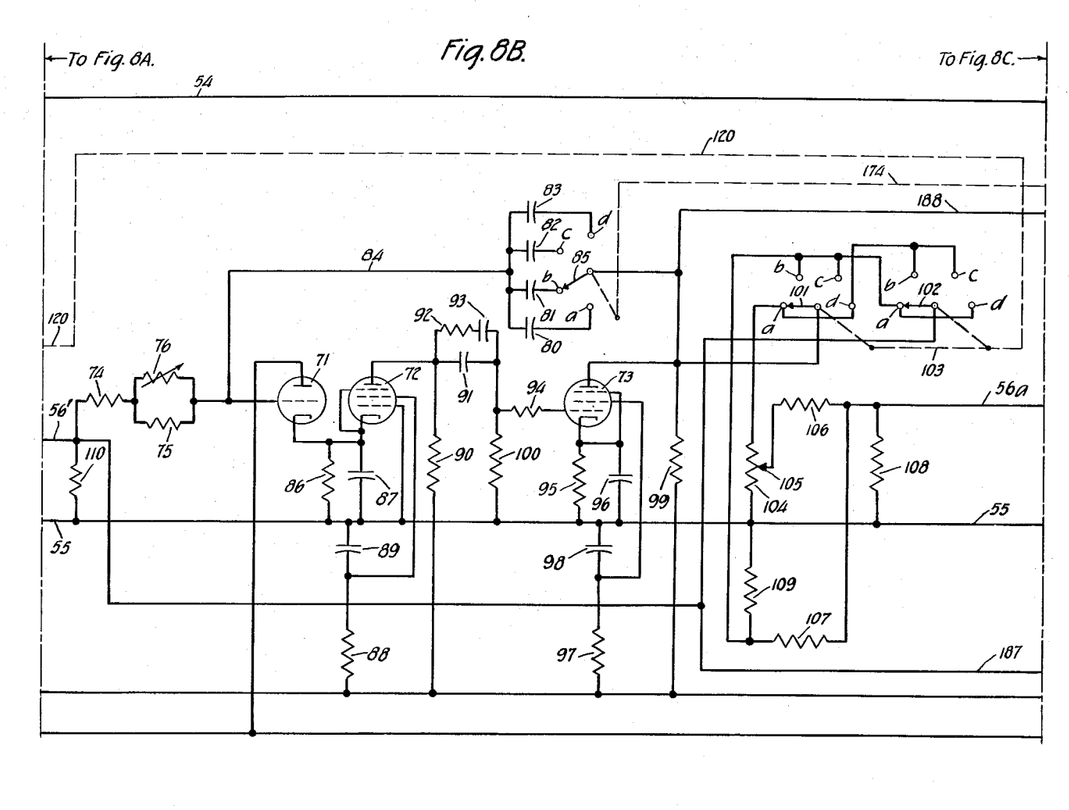
Figure 8C:
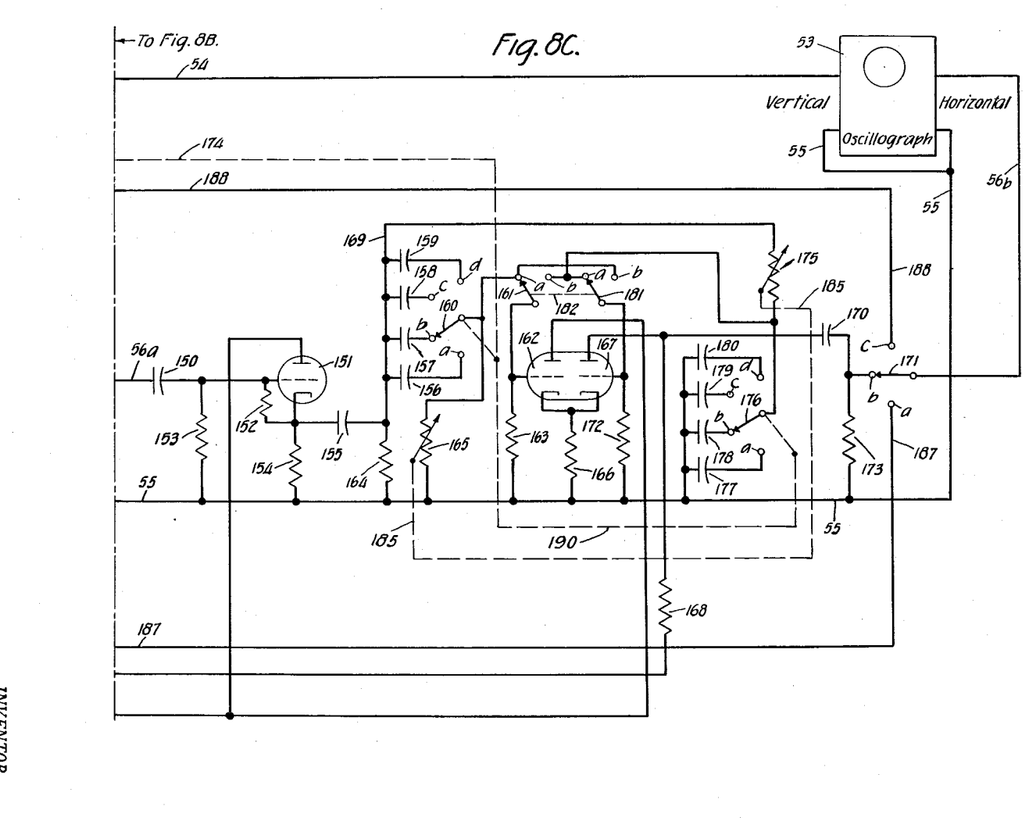

Figs. 8A, 8B, and 8C show a schematic diagram of a complete phase meter according to Fig. 1 and including a calibrated phase shifter of the integrator type according to Figs. 2, 4 and 6.

In Fig. 8A, the voltage input terminals 40 and 41 have the voltage $E_1$ applied thereto, and the voltage input terminals 42 and 43 have the voltage $E_2$ applied thereto. The voltages $E_1$ and $E_2$ are shown as being derived from a circuit 50 under test, having a supply voltage $E_1$ connected to the input terminals 44 and 45 thereof, and a voltage $E_2$ at the output thereof. The purpose of this particular test circuit arrangement is to measure the phase difference between the input voltage $E_1$ and the output voltage $E_2$.

The switch 51 corresponds with the switch 30 in Fig. 1, except that the lower pole of switch 30 is replaced by a permanent connection between the lower terminals for $E_1$ and $E_2$.

The calibrated phase shifter 20 of Fig. 1 is included in the circuit of Fig. 8B. The non-calibrated phase shifter 21 of Fig. 1 is included in the circuit of Fig. 8C. The oscillograph 53 of Fig. 1 is shown also in Fig. 8C.

The lower channel conductors 54 and 55 in Fig. 1, which connect directly to the vertical deflecting input terminals of the oscillograph 53, correspond to the conductors 54 and 55 in Figs. 8A, 8B and 8C. The upper channel conductors 56, 56a and 56b of Fig. 1 correspond to conductors 56 and 56' in Fig. 8A, conductors 56' and 56a in Fig. 8B, and conductors 56a and 56b in Fig. 8C, while conductors 57, 57a and 57b in Fig. 1, correspond to conductor 55 in Figs. 8A, 8B and 8C.

In Fig. 8A the switches 60 and 61 have the four positions (a), (b), (c) and (d), respectively, and are ganged together to operate in unison as indicated by the dotted line 62. When the switch 60 is in position (a) or (b), the input potential applied to terminals 40—41 $E_1$ connects with channel 55, 56'. When in positions (c) and (d), switch 60 connects the input potential applied to terminals 40—41 $E_1$ with the other channel 54, 55. Switch 61, when in positions (a) or (b), connects the other input potential $E_2$ with channel 54, 55, and in positions (c) or (d) connects $E_2$ with channel 55, 56.

When input potential $E_1$ connects with channel 55, 56' with switch 60 in position (a) or (b), the voltage $E_1$ is transmitted through the capacitor 63 to the potentiometer 64, whose sliding contact 65 connects with the grid of triode 66, having the grid leak resistor 69. The cathode follower resistor 67 is coupled by the capacitor 68 with conductor 56' which extends to the calibrated phase shifter shown in Figure 8B.

The triode 66 serves as an isolating stage to provide the desired impedance transformation between the source $E_1$ or $E_2$ and the input conductors 55, 56' of the calibrated phase shifter circuit of Fig. 8B.

A suitable source of current, such as the alternating current rectifier 70, Fig. 8A, is provided for energizing the direct current circuits of the electron discharge devices of Figs. 8A, 8B and 8C, the cathodes being heated in well known manner by the usual heater element, not shown.

In the calibrated phase shifter of Fig. 8B, the electron discharge devices 71, 72 and 73 serve as voltage amplifiers, corresponding in function with the amplifier 29 in Figs. 4 and 6. The fixed resistor 74 is connected to conductor 56' and in series with the fixed resistor 75 shunted by the variable resistor 76. Resistors 74, 75, 76 provide a variable resistance network connecting conductor 56' to the grid of triode 71 and to conductor 84, and corresponding with the variable series input resistor 26 in Figs. 4 and 6.

The capacitors 80, 81, 82, 83, Fig. 8B, of different capacitance values are selectively connectable one at a time in series with the conductor 84, by the rotary switch 85, which has the four contact positions (a), (b), (c) and (d), respectively, the selected capacitor corresponding with feed-back capacitor 27, Figs. 4 and 6.

The triode 71 is provided with a cathode follower resistor 86, which is included in the cathode to control grid circuit of pentode 72, and thus serves as a coupling between the output of triode 71 and the input of pentode 72. Resistor 86 is shunted by the capacitor 87. The grid leak resistor 110, for the grid of triode 71, is connected between conductors 56' and 55. The anode of triode 71 is supplied with a positive potential by rectifier 70 (Fig. 8A).

The positive screen grid potential in pentode 72 is reduced to the proper value by resistor 88, connected to rectifier 70, a bypass capacitor 89 connecting the screen grid with grounded conductor 55. The suppressor grid of pentode 72 is connected directly with the cathode. The anode of pentode 72 is connected through output resistor 90 with a positive terminal of the rectifier 70 (Fig. 8A). The output of pentode 72 connects from the anode thereof to the left terminal of capacitor 91 which is shunted by a circuit comprising a resistor 92 in series with a capacitor 93, the right hand terminal of capacitor 91 being connected through resistor 94 with the control grid of pentode 73.

The cathode of pentode 73 has a voltage dropping resistor 95, shunted by the capacitor 96. The screen grid is connected through resistor 97 with a positive terminal of rectifier 70 (Fig. 8A), a bypass condenser 98 being connected between the screen grid and grounded conductor 55. The suppressor grid is connected directly with the cathode, while the anode is connected through the output coupling resistor 99 with a positive terminal of the rectifier 70, the anode being also connected to switch arm 85. Resistor 94 connects from the control grid of pentode 73 through the leak resistor 100 to the conductor 55.

Switches 101 and 102 have four positions (a), (b), (c) and (d), and are coupled together to operate in unison, as indicated by the dotted line 103, and are also coupled with switches 60 and 61, Fig. 8A, as indicated by the dotted line 120.

When switch 101 is in the position (a) or (d) it connects the anode or output circuit of pentode 73 through contact (a) or (d) of switch 101 with potentiometer 104, and from the slider 105 through resistor 106 to the output conductor 56a, while switch 102 in position (a) or (d) connects the input conductor 56' through contact (a) or (d) of switch 102 through resistor 107 with the output conductor 56a of the calibrated phase shifter. The connection from the output conductor 56a to the input conductor 56', provides a feed back from the output to the input of the phase shifter, as indicated in Fig. 4, by the conductor including resistor 24. Potentiometer 104, Fig. 8B, corresponds with potentiometer 22, Fig. 4. Resistor 108, Fig. 8B, provides an output coupling across the output conductors 56a and 55 of the calibrated phase shifter. The resistors 106, 107 and 108 are adder resistors corresponding respectively with the adder resistors 23, 24 and 25, Fig. 4. Resistor 109, Fig. 8B, corresponds with the dummy load resistor 28 in Fig. 4.

When switches 101 and 102 are in positions (b) or (c), the potentiometer 104 and resistor 106 are transferred from the output of the amplifier, as shown schematically by potentiometer 22 and resistor 23 in Fig. 4, to the input of the phase shifter, as shown schematically in Fig. 6, and the resistors 107 and 109 are transferred from the input of the phase shifter, as shown schematically by resistors 24 and 28, in Fig. 4, to the output of the amplifier as shown schematically in Fig. 6.

The interstage coupling network 91, 92, 93, is adjusted to stabilize the operation of the amplifier by suppressing undesired oscillations.

In the non-calibrated phase shifter of Fig. 8C, the conductor 56a connects through the capacitor 150 with the grid of triode 151 which serves as an isolating stage to provide the desired impedance transformation between the calibrated phase shifter of Fig. 8B and the uncalibrated phase shifter of Fig. 8C. A resistor 152 connects the grid directly to the cathode of triode 151. The anode of triode 151 connects with a positive terminal of rectifier 70, Fig. 8A.

Coupling resistor 153 connects the grid of triode 151 to conductor 55. The cathode of triode 151 has a cathode follower resistor 154 which connects through a capacitor 155 to the coupling resistor 164 and also to the conductor 169.

Conductor 169 connects with the group of capacitors 156, 157, 158, 159 any one capacitor of which is selectable by the rotary switch 160, having respectively the four contact positions (a), (b), (c), (d).

The 180° phase shift switches 161 and 181 are coupled together as indicated by the dotted line 182, to operate in unison between contacts (a) and (b). The grid of triode 162 connects through the leak resistor 163 to conductor 55, the grid also being connected to switch 161. The variable resistor 165 connects switch 160 to grounded conductor 55.

The cathode of triode 162 is provided with a cathode follower resistor 166 which is also included in the cathode to control the grid circuit of triode 167 and serves as a coupling between these triodes. The anode circuit of triode 162 is energized from a positive terminal of rectifier 70, Fig. 8A, and the anode circuit of triode 167 is energized through resistor 168 from a positive terminal of rectifier 70. The output circuit of triode 167 connects from the anode thereof through the capacitor 170 and the phase meter output resistor 173 to conductor 55, and also connects to the contact (b) of the rotary switch 171 which in turn connects with conductor 56b leading to the upper horizontal deflecting input connection of oscillograph 53, the lower horizontal deflecting input connection of oscillograph 53 being connected to grounded conductor 55. The grid of triode 167 connects through the leak resistor 172 with grounded conductor 55, the grid also being connected to the rotary switch 181.

Conductor 169 connects through a variable resistor 175 to the rotary switch 176, having the four contact positions (a), (b), (c) and (d) connected respectively to the capacitors 177, 178, 179 and 180, the other terminals of which are connected to conductor 55. Switch 176 is coupled with switch 160, Fig. 8C, to operate in unison therewith, as indicated by the dotted line 190, and in unison with switch 85, Fig. 8B, as indicated by dotted line 174.

The variable resistor 175, Fig. 8C, connects conductor 169 to switch 176, and is coupled with variable resistor 165, as indicated by the dotted line 185, to permit of operation of these resistors in unison with each other.

It will be seen that resistor 165 in series with the capacitor selected by switch 160 from the group of capacitors 156 to 159, forms one arm of a bridge between conductor 169 and conductor 55. The other arm of the bridge includes the resistor 175 in series with switch 176 and the capacitor selected thereby in the group of capacitors 177 to 180. When switch 161 is in position (a) it will be noted that the grid of triode 162 connects with switch arm 160, while the grid of triode 167 connects with switch arm 176. When switch 161 is in position (b) the grid connections are interchanged, so that the grid of triode 162 connects with switch arm 176 and the grid of triode 167 connects with the switch arm 160.

Figure 5:
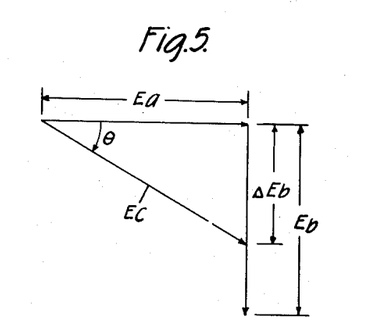
Figures 5 and 7 are vector diagrams illustrating the operation of the circuits of Figures 4 and 6, respectively.

Rotary switch 171 is provided with a contact (a) connected to conductor 187 connecting directly with the upper input conductor 56' of the calibrated phase shifter of Figure 8B, so that when switch 171 is in position (a), the input voltage of the calibrated phase shifter, which corresponds with voltage $E_a$ in Figs. 4 and 5, is applied directly to the horizontal input of oscillograph 53.

When switch 171 is in position (c), the horizontal input of the oscillograph 53 is connected through contact (c) of switch 171 and conductor 188 with the anode of pentode 73, Figure 8B, so that the output voltage of the calibrated phase shifter amplifier, which corresponds with voltage $E_b$ in Figs. 4 and 5, is applied directly to the horizontal input of the oscillograph 53. By comparing the oscillograph indications when switch 171 is in positions (a) and (c), the output voltage $E_b$ of pentode 73 may be compared with the input voltage $E_a$ across conductors 56', 55 and these voltages may be made equal by adjustment of resistor 76, Figure 8B, and by selection of the proper capacitors by the coupled switches 85 of Fig. 8B, and 160 and 176 of Fig. 8C.

The non-calibrated phase shifting bridge arrangement, including the resistors 165 and 175, and the capacitors selected by switches 160 and 176, combined with triodes 162 and 167, make it possible to shift the phase of the output voltage across coupling resistor 173 with respect to the input voltage across conductors 169 and 55 through any desired angle within a range of 180°, it being merely necessary to shift the adjustment of the unitary controlled resistors 165 and 175. The voltage across resistor 173 is equal to the difference between the voltage from the grid of triode 162 to the conductor 55 and the voltage from the grid of triode 167 to the conductor 55, so that by throwing the unitary controlled switches 161, 181 from position (a) to position (b), the connections of the grids of these triodes are interchanged and a phase shift of 180° is introduced in the output voltage across resistor 173 with respect to that produced when switches 161 and 181 are in position (a).

Unitary controlled switches 85, Fig. 8B and 160 and 176, Fig. 8C, are frequency band switches for selecting capacitors of suitable value for use in different frequency bands, so that in any one position of these switches the capacitor selected by switch 85 has such a value that the product of $2\pi$ times the frequency, times the resistance of network 74, 75 and 76, times the capacitance of the capacitor selected by switch 85, equals 1, or $\omega RC = 1$, as previously described in connection with Fig. 4.

In one example of a phase meter according to the circuit of Figs. 8A, 8B and 8C, the capacitors selected by the switch 85, covered the following frequency ranges:

*Frequency range in C. P. S.*

| Capacitor | From— | To— |
| --- | --- | --- |
| 80 | 20 | 200 |
| 81 | 200 | 2,000 |
| 82 | 2,000 | 20,000 |
| 83 | 20,000 | 200,000 |

The capacitors selected by switches 160 and 176 provide for the same ranges of frequency as those provided by the capacitors selected by switch 85.

Switches 60 and 61, Fig. 8A, together with switches 101 and 102, Fig. 8B, which all operate together under unitary control, make it possible to employ the potentiometer 104 of the calibrated phase shifter to measure phase angles extending over a 360° range. In order to extend the range of the calibrated phase shifter of Fig. 8B beyond the range from 0° to —90°, to cover the range from 0° to +90°, it is merely necessary to interchange the connection of voltages $E_1$ and $E_2$. This method is free from the possibility of producing a false indication on the oscillograph 53, because if $E_2$ leads $E_1$ (that is, by 90° or less), the potentiometer 104 can be adjusted until the oscilloscope 53 displays a collapsed ellipse indication of the correct slope which is standardized to be the same slope for all measurements with the phase meter of Figs. 8A, 8B and 8C. If on the other hand, $E_2$ lags $E_1$ (that is, by 90° or less), the phase shifter is not capable of adjustment to produce a collapsed ellipse of the correct slope on the oscillograph 53, and it is only possible to produce such an indication of a collapsed ellipse of the correct slope by interchanging $E_1$, $E_2$. The switches 60, 61, Fig. 8A are provided for accomplishing this interchange of $E_1$ and $E_2$.

When the switches 60 and 61 are in position (a) the range covers from 0 to —45°; in position (b), the range covers from —45° to —90°; in position (c), the range is +45° to +90°; and in the position (d), the range is zero degrees to +45°. The ranges so far described of these switches, thus extend from —90° through 0° to +90°.

In order to extend the range of the phase meter to cover phase angles from —90° to —180°, and from +90° to +180°, the unitary controlled switches 161 and 181, Fig. 8C, are switched from contacts (a) to (b), and 180° is then added to each reading of the angle on potentiometer 104, Fig. 8B.

When operating the phase meter of Figs. 8A, 8B and 8C, the following procedure may be observed:

The source of voltage $E_1$ is first connected to the terminals 40 and 41 of Fig. 8A. Switch 60 and the other switches ganged thereto, are placed in position (a). Switch 171 is placed in position (a). The input voltage across conductors 55, 56' of the calibrated phase shifter of Fig. 8B is then made equal to the output voltage of the amplifier 73 by equalizing the indication produced on the oscillograph 53. The voltage equalization is accomplished by alternately connecting the switch 171, Fig. 8C, to positions (a) and (c) while adjusting the resistor 76, Fig. 8B, and, if necessary, adjusting the positions of the switch 85 with its ganged switches. When the voltages are equalized, they correspond to the equalized voltages $E_a$ and $E_b$ in Fig. 4, as previously described.

Switch 171 is then placed on (b), switch 161 at position (a), and switch 51 at its upper position. The potentiometer 104 is then set on 0°, that is, at its lower limit of adjustment.

The uncalibrated phase shifter of Fig. 8C is then adjusted by adjustment of the resistor 165 with its ganged resistor 175 until the oscillograph 53 displays a collapsed ellipse which slopes either upward or downward, this fact being noted for future reference as hereinafter explained.

The source of the voltage $E_2$, if not already connected, may then be connected to the terminals 42, 43, Fig. 8A. Switch 51 is then placed in its lower position. Potentiometer 104 is then adjusted through its 45° range, or until the oscillograph 53 displays a collapsed ellipse which slopes in the same direction as noted in the reference above. If the ellipse fails to so collapse, switch 60 is moved to position (b) and the potentiometer 104 is again adjusted in search of a balance, and if no such balance is obtained, as indicated by the oscillograph 53, switch 60 is moved successively to positions (c) and (d), while repeating the adjustment of potentiometer 104. If no balance is obtained thus far, switch 161 is moved to position (b) and the above procedure of adjusting potentiometer 104 for each position of switch 60 is followed until a balance is indicated by the oscillograph 53. After observing a few measurements so that the operator becomes familiar with the operation of the phase meter, the procedure may be considerably simplified by turning switches 60 and 161 to their proper final positions without going through all of the above described intermediate steps.

The potentiometer 104 is calibrated to read directly in angular measure, the phase shift introduced by the calibrated phase shifter of Fig. 8B, the 0° to 45° calibration being read when switch 60 is in position (a) or (d) and a 45° to 90° calibration being read when switch 60 is in position (b) or (c). A minus sign is placed before the angle read on potentiometer 104 when the phase balance is obtained with switch 60 in position (a) or (b), and a positive sign is placed before the angle, if the balance is obtained when switch 60 is in position (c) or (d). If the balance is obtained with switch 161 in position (a) nothing is added to the reading of potentiometer 104, while if switch 161 is in position (b) when the balance is obtained, 180° is added to the angle reading.

Further measurements of the phase angle between $E_1$ and $E_2$ may now be made by merely adjusting the potentiometer 104 as long as the angle being measured remains within the 45° range of the potentiometer, for any given position of switch 60. If the phase angle to be measured extends outside of the 45° range of potentiometer 104 for which the switch 60 is set, it is then merely necessary to operate the switch 60 to its proper position and to make any needed operation of the switch 161 within the wide frequency range corresponding to any one setting of the band switch 85.

It will be seen that after preliminary adjustment of the phase meter, the phase angle between the voltages $E_1$ and $E_2$ can be accurately measured by merely adjusting a single control element, namely potentiometer 104, and reading its scale. If, after the preliminary adjustment, the phase angle between $E_1$ and $E_2$ has changed but the frequency of $E_1$ and $E_2$ is the same, the only control that need be operated to make the measurement is the potentiometer 104. If the amplitude of either $E_1$ and/or $E_2$ change but the frequency and phase angles of $E_1$ and $E_2$ remain the same, no change in the adjustment of the control element 104 need be made. If the frequency changes after the preliminary adjustment, the meter must be completely readjusted. However, the dial calibration of the potentiometer 104 remains the same at all frequencies within the operating frequency range of the instrument.

Figure 9A:
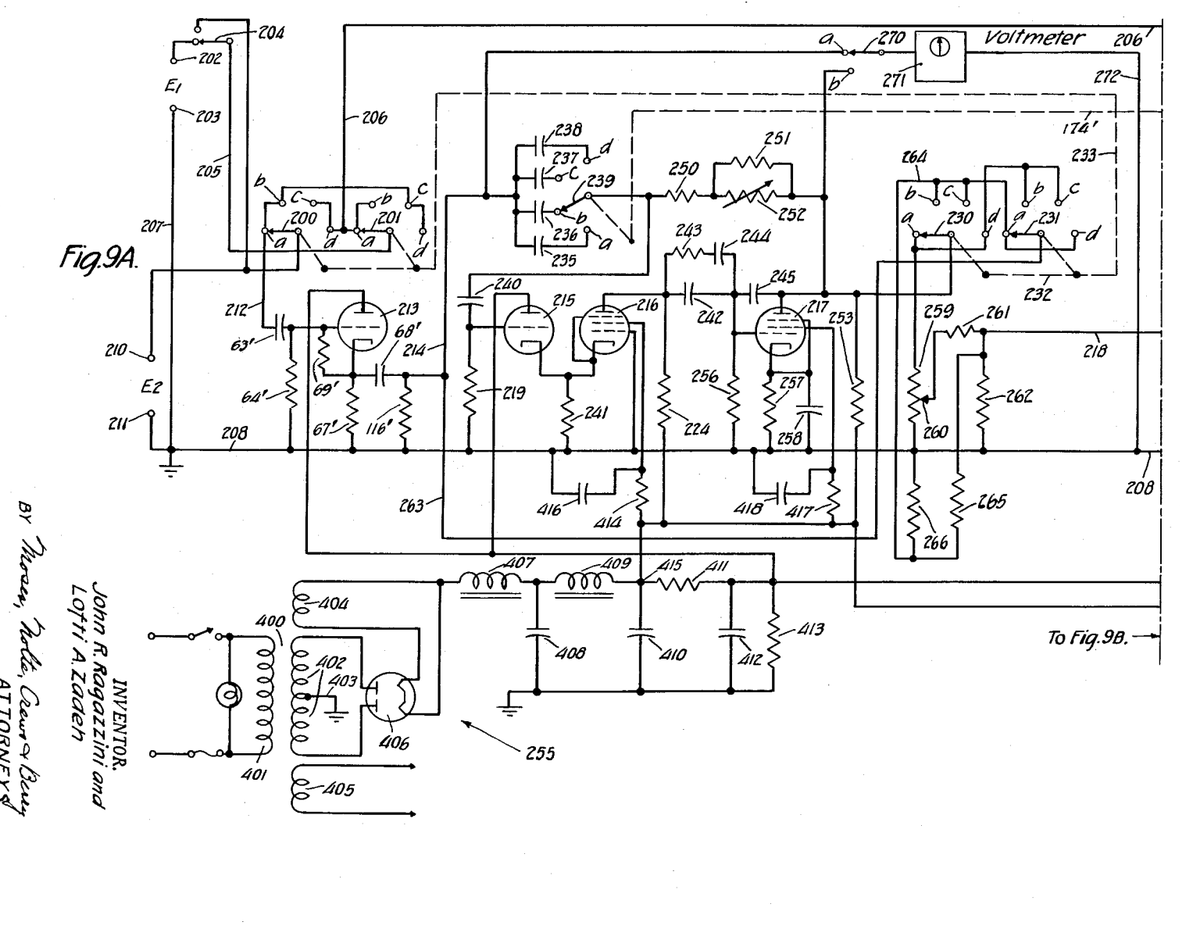
Figure 9B:
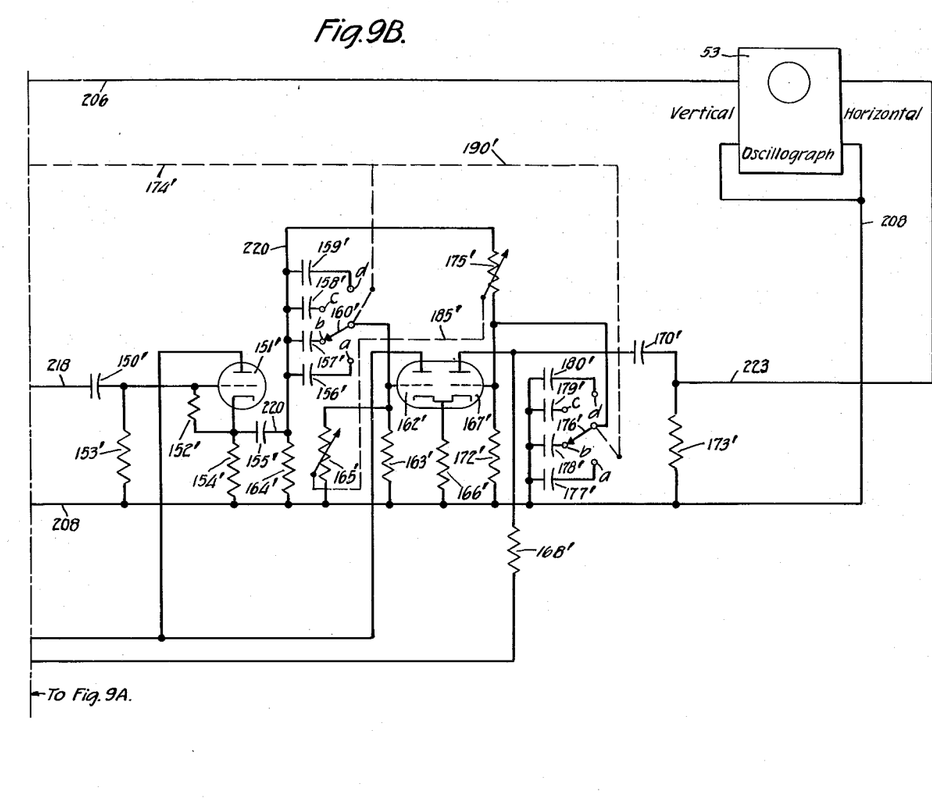

Figs. 9A and 9B illustrate a circuit similar to that of Figs. 8A, 8B and 8C, except that the differentiator type of calibrated phase shifter is employed, as shown schematically in Fig. 3, in place of the integrator type, shown in Fig. 2. It will be noted that some of the parts in Figs. 9A and 9B which are similar to corresponding parts in Figs. 8A, 8B and 8C, are given the same reference numerals distinguished by primes. It will be also noted that in Figs. 9A and 9B, the input voltage $E_1$ and the input voltage $E_2$ are interchanged from the positions shown in Fig. 8A, so that when the ganged rotary switches 200 and 201, in Fig. 9A, are in the position (a), the voltage $E_1$ is connected directly from input terminals 202 and 203 to the vertical deflecting input terminals of the oscillograph 53, Fig. 9B, over a path which may be traced from the upper input terminal 202 for voltage $E_1$, the lower contact of switch 204, to switch 204 and conductor 205 to switch 201, through contact (a) of switch 201 and conductor 206, to the upper vertical deflecting terminal of oscillograph 53, and returning from the lower vertical deflecting terminal of oscillograph 53, to grounded conductor 208, leading to conductor 207 and terminal 203, Fig. 9A. The described path for voltage E₁ thus corresponds with the lower channel in Fig. 1.

The voltage E₂ in Fig. 9A is connected at input terminals 210 and 211, through a calibrated phase shifter, Fig. 9A, and a non-calibrated phase shifter, Fig. 9B, to the horizontal deflecting input terminals of the oscillograph 53, Fig. 9B, similarly to the connection in Fig. 1 of voltage E₁ to the horizontal deflecting input terminals of the oscillograph 53. The path for voltage E₂ in Figs. 9A and 9B may be traced from the upper input terminal 210, to switch 200, over contact (*a*), conductor 212, isolating amplifier 213, conductor 214, voltage amplifiers 215, 216 and 217 in cascade in the calibrated phase shifter, over output conductor 218 of the calibrated phase shifter, and then to Fig. 9B, over isolating amplifier 151', to conductor 220, forming the input conductor of the non-calibrated phase shifter, including electron discharge devices 162' and 167' to the output conductor 223, connected to the upper horizontal deflecting input terminal of oscillograph 53. The return path from the oscillograph may be traced from the lower horizontal terminal thereof, over conductor 208, to Fig. 9A, and directly to the lower input terminal 211 for the voltage E₂.

In Fig. 9A, the isolating amplifier 213 corresponds in function with the isolating amplifier 66 in Fig. 8A, and includes similar elements in its circuit connections, as indicated by the same reference numerals with primes. The voltage amplifiers 215, 216, 217 in the calibrated phase shifter in Fig. 9A, correspond with amplifiers 71, 72, 73 in Fig. 8B, and employ circuit connections which are similar to the amplifiers 71, 72, 73, Fig. 8B, except as will be noted hereinafter. The isolating amplifier 151', Fig. 9B, corresponds with the isolating amplifier 151 in Fig. 8C. The non-calibrated phase shifter triodes 162' and 167' in Fig. 9B, correspond with triodes 162 and 167 in Fig. 8C. Conductors 223 and 208, Fig. 9B, connected to the horizontal deflecting input terminals of oscillograph 53, Fig. 9B, correspond with conductors 56*b* and 55, respectively, in Fig. 8C.

Rotary switches 230 and 231, Fig. 9A, are coupled together to operate in unison, as indicated by the dotted line 232, and are also coupled with switches 200 and 201, to operate in unison therewith as indicated by the dotted line 233. Switches 230 and 231, Fig. 9A, correspond with switches 101 and 102, Fig. 8B. Conductor 214 is connected to capacitors 235, 236, 237 and 238, any one of which is selectable by the rotary switch arm 239, having the contacts (*a*), (*b*), (*c*) and (*d*). Switch 239 connects through the coupling capacitor 240 with the grid of triode 215, having the grid leak resistor 219.

The cathode follower resistor 241, connected between the cathode of triode 215 and conductor 208, is included in the cathode to control grid circuit of pentode 216 to provide a coupling between triode 215 and pentode 216. The pentode 216 has an output coupling resistor 224 in its anode circuit. The anode of pentode 216 connects through the capacitor 242 to the control grid of pentode 217. The resistor 243 in series with the capacitor 244 is connected in shunt with the capacitor 242 to provide a stabilizing network, corresponding with the network 91, 92, 93 in Fig. 8B.

The pentode 217, Fig. 9A, corresponds generally with the pentode 73, Fig. 8B, but it will be noted that the resistor corresponding with resistor 94, Fig. 8B, is omitted from Fig. 9A, and that the capacitor 245, Fig. 9A, which is included between the control grid and the anode of pentode 217, has no corresponding element in Fig. 8B.

Switch 239 connects through resistor 250 in series with resistor 251 to the anode of pentode 217, Fig. 9A, the resistor 251 being shunted by the variable resistor 252. The resistor network 250, 251, 252, corresponds with the variable resistor R in Fig. 3. The capacitor selected by switch 239, corresponds with the capacitor C in Fig. 3. The anode and other direct current circuits of triodes 213 and 215, and of pentodes 216 and 217 are energized from a suitable D. C. source, such as the rectifier 255 connected to an alternating current source.

The rectifier 255 has the transformer 400 with the primary 401 connected to the alternating current source, the secondary 402 having the grounded mid-tap 403, and the cathode heating secondaries 404 and 405. The terminals of secondary 402 are connected respectively to the two anodes of the rectifier tube 406, the cathode of which is heated from secondary 404 and is connected through the inductance 407 and capacitor 408 to ground. Elements 407 and 408 comprise the first section of a ripple suppressing filter having in cascade therewith a second section comprising inductance 409 in series with capacitor 410, and a third section comprising the resistor 411 in series with the capacitor 412 having the resistor 413 in shunt therewith. The screen grid of pentode 216 is connected through resistor 414 with terminal 415 of the rectifier filter, the capacitor 416 being connected between the screen grid and grounded conductor 208, the screen grid of pentode 217 being connected through the resistor 417 with the terminal 415, the capacitor 418 being connected between the screen grid and conductor 208.

The pentode 217 has a leak resistor 256 connecting its control grid with conductor 208, and has a cathode dropping resistor 257 shunted by the capacitor 258. The output coupling resistor 253 is connected between the anode of pentode 217 and rectifier 255. The anode of pentode 217 is connected to switch 230 which, in position (*a*), connects through potentiometer 259 with conductor 208. The sliding contact 260 on potentiometer 259 connects through resistor 261 to conductor 218. The output coupling resistor 262 of the calibrated phase shifter of Fig. 9A, connects conductor 218 with conductor 208. Conductor 214, at the input of the calibrated phase shifter, connects with conductor 263 leading to switch 231 which, in position (*a*), connects with conductor 264 which in turn connects through resistor 265 to conductor 218. Conductor 264 also connects through resistor 266 to conductor 208.

The measuring potentiometer 259 corresponds with measuring potentiometer 104, Fig. 4. The combination of resistor 261, resistor 265 and resistor 262, Fig. 9A, provide an adder network, corresponding with the adder network in Fig. 4, including respectively, resistors 23, 24, 25. Resistor 266 serves as a dummy load for compensating for the transfer of potentiometer 259 from the output to the input of the calibrated phase shifter by means of switches 230 and 231, and corresponds with resistor 109, Fig. 8B.

The non-calibrated phase shifter shown in Fig. 9B is similar to that of Fig. 8C, except that switches 161 and 181 of Fig. 8C are omitted and permanent connections are provided corresponding with the circuit when switches 161 and 181 are in position (*a*). It will be noted that the frequency band switches 160', 176', Fig. 9B are coupled together as indicated by dotted line 190, and are also coupled as indicated by dotted line 174' with switch 239, Fig. 9A, so that switches 239 (Fig. 9A) an 160', 176' (Fig. 9B), correspond respectively with switches 85 (Fig. 8B) and 160, 176 (Fig. 8C).

Instead of employing oscillograph 53 for indicating equality of the input and output voltages of the calibrated phase shifter in Fig. 9A, in the manner indicated in Figs. 8B and 8C, wherein switch 171, in its positions (*a*) and (*c*), connects the oscillograph with the input and output, respectively, of the phase shifter, a switch 270, Fig. 9A, in its upper position (*a*), connects the conductor 214, at the input of the calibrated phase shifter, with one terminal of a suitable voltage indicating device, such as the vacuum tube voltmeter 271, the other terminal of the voltmeter 271 being connected to conductor 272, leading to conductor 208. Switch 270 in its lower position (*b*), connects the voltmeter 271 to the output of the amplifier of the calibrated phase shifter at the anode of pentode 217. The input and output voltages of the amplifier may be adjusted to equality by operating switch 270 alternately to positions (a) and (b) while adjusting the variable resistor 252 and frequency band switch 239, Fig. 9A, until the voltmeter 271 indicates the same voltage for both positions of switch 270.

When operating the phase meter of Figs. 9A and 9B the procedure is similar to that already described in connection with Figs. 8A, 8B and 8C. The source of voltage $E_1$, however, is temporarily connected with terminals 210 and 211. Switch 200 and the other switches ganged thereto are placed in position (a). The input voltage $E_a$ in the calibrated phase shifter (see Fig. 3 for general schematic diagram) between conductors 214 and 208, Fig. 9A, is then adjusted to equality with the output voltage $E_b$ of the amplifiers 215, 216, 217 of the calibrated phase shifter between the anode of pentode 217 and conductor 208. Equalization of $E_a$ and $E_b$ is obtained by alternately positioning switch 270 in position (a) and (b), while adjusting resistor 252 and switch 239, as referred to above.

Switch 204 is then placed in its upper position. Potentiometer 259 is set on 0°, that is, at its lower limit of adjustment.

The uncalibrated phase shifter of Fig. 9B is then adjusted by adjustment of the resistor 165' with its ganged resistor 175' until the oscillograph 53 displays a collapsed ellipse in the form of a line which slopes either upward or downward, this fact being noted for future reference, as further explained hereinafter.

The source of voltage $E_1$ is now removed from terminals 210 and 211 and the source of voltage $E_2$ is connected in place thereof, the source $E_1$ being connected with the terminals 202 and 203, as indicated in Fig. 9A. Switch 204 is then placed in its lower position. Potentiometer 259 is adjusted through its 45° range, or until the oscillograph 53 displaces a collapsed ellipse. If the ellipse fails to collapse, switch 200 is then operated to its next position and the potentiometer adjustments repeated, and so on for each position of switch 200 until a phase balance is indicated by a collapsed ellipse on the oscillograph.

The setting of potentiometer 259 is then read from its 0° to 45° calibration, if switch 200 is in position (a) or (d), and is read from its 45° to 90° calibration, if switch 200 is in position (b) or (c). A positive sign is placed before the angle reading of potentiometer 259 when the switch 200 is in position (a) or (b), and a negative sign is placed before the angle reading if the balance is obtained when switch 200 is in position (c) or (d).

If the collapsed ellipse on oscillograph 53 slopes upward while originally the slope of the collapsed ellipse referred to above was downward, or vice versa, 180° is added to the reading of potentiometer 259. By observing the direction of the slope of the collapsed ellipse on the oscillograph 53, it will be seen that it is unnecessary to introduce a reversal of phase in the non-calibrated phase shifter, as is accomplished by switch 161 in Fig. 8C. The non-calibrated phase shifter is thus more simplified in Fig. 9B than in Fig. 8C. It will be understood that the switches 161 and 181, Fig. 8C, may be left in position (a), or the circuit permanently connected in this form, without providing these switches, the necessity of adding 180° to the reading of the phase angle being determined as in the case of Figs. 9A and 9B.

While the present phase meter is capable of operating over the extremely broad frequency bands heretofore described, the term "substantial range of frequencies" as used in the claims is not to be construed as limited to such broad frequency bands, but is intended to designate frequency ranges differing substantially from the useable frequency ranges of phase meters which are designed for operation at only a single frequency. Hence the term "substantial range of frequencies" may be understood to mean a frequency range of at least 1.1 to 1.

The following are the values of resistors, capacitors, and other elements and voltages illustrative of one example of a phase meter constructed in accordance with the circuit of Figs. 9A and 9B. It will be understood, however, that various other values of the circuit elements can be used in other examples of this circuit.

Resistors

| Reference numerals: | Value in ohms |
|---|---|
| 64'; 243; 251; 256 _________________meg__ | 1 |
| 153'; 163'; 219 ______________________ | 500K |
| 252 _______________________(variable)__ | 500K |
| 414; 417 ___________________________ | 250K |
| 173'; 261; 265 _______________________ | 200K |
| 69'; 152'; 168' ______________________ | 100K |
| 165'; 175' ________________(variable)__ | 100K |
| 67'; 266 ___________________________ | 50K |
| 259 ___________________(potentiometer)__ | 50K |
| 413 _______________________________ | 30K |
| 224; 253 ___________________________ | 25K |
| 262; 411 ___________________________ | 20K |
| 116'; 264; 250 ______________________ | 10K |
| 154 _______________________________ | 5K |
| 166 _______________________________ | 2K |
| 153; 172; 241 ______________________ | 500 |
| 257 _______________________________ | 350 |

Capacitors

| Reference numerals: | Capacitances |
|---|---|
| 258 _____________________________µf__ | 100 |
| 412 _____________________________µf__ | 30 |
| 216; 217; 408; 410; 416; 418 ________µf__ | 16 |
| 68'; 155'; 156'; 170'; 177'; 244 _______µf__ | 1 |
| 63'; 157'; 178'; 242 _______________µf__ | .1 |
| 150'; 235; 240 ____________________µf__ | .05 |
| 158'; 179' _______________________µf__ | .01 |
| 236 _____________________________µf__ | .005 |
| 159'; 180' _______________________µf__ | .001 |
| 237 _____________________________µµf__ | 500 |
| 238 _____________________________µµf__ | 100 |
| 245 _____________________________µµf__ | 5 |

Inductors

| 407; 409 _________________________henries__ | 15 |
|---|---|

Tubes

| Reference numerals: | Type |
|---|---|
| 406 _______________________________ | 5U4G |
| 217 _______________________________ | 6AC7 |
| 213; 215 ___________________________ | 6J5 |
| 216 _______________________________ | 6SJ7 |
| 162'; 167' _________________________ | 6SL7 |

Voltages

| 401 ______________________(60 C. P. S.)__ | 125 |
|---|---|
| 402 _______________________________ | 2X440 |
| 404 _______________________________ | 5 |
| 405 _______________________________ | 6.3 |

We have described what we believe to be the best embodiments of our invention. We do not wish, however, to be confined to the embodiments shown, but what we desire to cover by Letters Patent is set forth in the appended claims.

We claim:

1. A phase meter comprising means to indicate a predetermined phase difference between two waves of voltage, a separate path to said indicating means for each of said waves; a calibrated phase shifter having the same calibration for a plurality of substantially different frequencies, said phase shifter comprising means in one of said paths for deriving from the voltage applied thereto two voltages accurately 90° out of phase with each other at any of said frequencies, calibrated adjusting means for selecting any desired fraction of one of said two voltages from zero to a maximum value of said fraction and means for adding said selected fraction of said one voltage to the other of said two voltages and for transmitting the resultant of said added voltages to said indicating means over the path which includes said voltage deriving means; and adjustable phase shifting means in one of said paths for adjusting the difference between the phase shifts of said two paths to said predetermined phase difference when said calibrated phase shifter has a predetermined initial reading, whereby said calibrated phase shifter is enabled to maintain its calibration over said frequency range, said calibrated phase shifter being adjustable to produce said predetermined phase difference at said indicating means when said two waves of voltages are applied to said two paths, respectively.

2. A phase meter according to claim 1, further comprising means included in one of said paths for shifting the phase of the voltage wave therein through an angle of 180 degrees.

3. A phase meter according to claim 1, further comprising manually operable means for changing the frequency operating range of said adjustable phase shifting means and of said voltage deriving means in predetermined relation to each other.

4. A phase meter according to claim 1, wherein said voltage deriving means includes a 90 degree phase shifter comprising an amplifier having an input and an output, a first impedance element connected in series with said input, and a feed-back path including a second impedance element connected directly from said output to said input.

5. A phase meter according to claim 4 in which said amplifier is of the integrator type, said first impedance element being a resistor and said second impedance element being a capacitor.

6. A phase meter according to claim 4 in which said amplifier is of the differentiator type, said first impedance element being a capacitor and said second impedance element being a resistor.

7. A phase meter for measuring the difference in phase angle between two potentials, comprising: a first substantially continuously adjustable means producing a phase shift of which the magnitude may be varied; a second substantially continuously adjustable means producing a further phase shift of which the magnitude may be varied, said first and said second adjustable means being connected in cascade relationship; measuring means including a calibrated scale operatively associated with one of said adjustable means for indicating the magnitude of the phase shift produced thereby; said one adjustable means having the same calibration at substantially different frequencies indicating means for indicating a predetermined phase relationship between said two potentials; and circuit means for connecting one of said potentials to said indicating means simultaneously both directly and through said two adjustable means, said circuit means including switching means for selectively changing said connections to connect one of said two potentials directly to said indicating means and simultaneously connect the other of said potentials to said indicating means through said two adjustable means.

8. A phase meter according to claim 7 in which one of said adjustable means comprises means for deriving from the potential applied thereto, two equal voltages differing accurately in phase from each other by an angle of 90° throughout a substantial range of frequencies, selecting means for selecting any desired fraction of one of said two equal voltages from zero to the full voltage thereof, and means for adding said selected fraction of said one voltage to the other of said two equal voltages, adjustment of said adjustable means being effected by varying the value of said selected fraction of said one voltage, said calibrated scale being operatively associated with said selecting means.

9. A phase meter according to claim 8, further comprising manually operable switching means for selectively switching said selecting means to select said desired fraction from either of said two equal voltages.

10. A phase meter according to claim 8, further comprising switching means operatively associated with said voltage deriving means for changing the effective range of said substantial range of frequencies to at least one other substantial range of frequencies.

References Cited in the file of this patent

UNITED STATES PATENTS

| | | |
|---|---|---|
| 2,085,940 | Armstrong | July 6, 1937 |
| 2,086,421 | Jones et al. | July 6, 1937 |
| 2,176,120 | Brown et al. | Oct. 17, 1939 |
| 2,178,012 | White | Oct. 31, 1939 |
| 2,341,232 | Norton | Feb. 8, 1944 |
| 2,429,844 | Rothman et al. | Oct. 28, 1947 |
| 2,436,479 | Luck | Feb. 24, 1948 |
| 2,451,796 | Berkoff | Oct. 19, 1948 |
| 2,477,023 | Weaver | July 26, 1949 |
| 2,525,448 | Clarke | Oct. 10, 1950 |
| 2,527,096 | Howes | Oct. 24, 1950 |
| 2,530,528 | Kreer | Nov. 21, 1950 |
| 2,576,818 | Waynick | Nov. 27, 1951 |
| 2,579,586 | Kroft | Dec. 25, 1951 |
| 2,622,127 | Alsberg | Dec. 16, 1952 |

FOREIGN PATENTS

| | | |
|---|---|---|
| 631,203 | Great Britain | Oct. 28, 1949 |

OTHER REFERENCES

Publication I: "A Simple Variable Frequency Phase Measuring Device" by J. C. West and J. Patts; Electronic Engineering, vol. 24, No. 295, September 1952, pages 402 and 403.